United States Patent

Ootake et al.

[11] Patent Number: 5,488,868
[45] Date of Patent: Feb. 6, 1996

[54] HIGH-TEMPERATURE PRESSURE SENSOR

[75] Inventors: Seiichirou Ootake; Kazuyoshi Nagase, both of Aichi; Shinji Ozaki, Toyohashi; Makoto Hatanaka, Handa, all of Japan

[73] Assignee: Nippondenso Co., Ltd.

[21] Appl. No.: 251,688

[22] Filed: May 31, 1994

[30] Foreign Application Priority Data

Jun. 1, 1993 [JP] Japan .................... 5-130279

[51] Int. Cl.$^6$ .................................. G01L 23/18
[52] U.S. Cl. .................. 73/708; 73/115; 73/727; 73/754; 310/338
[58] Field of Search ............... 73/723, 715, 35, 73/115, 721, 754, 708, 727, DIG. 4; 310/338

[56] References Cited

U.S. PATENT DOCUMENTS

| | | | |
|---|---|---|---|
| 2,319,219 | 5/1943 | Draper et al. | 73/35 M |
| 4,322,978 | 4/1982 | Fromm | 73/723 |
| 4,519,254 | 5/1985 | Sonderegger et al. | 73/726 |
| 4,567,751 | 2/1986 | Ootsuka et al. | 73/35 |
| 4,570,097 | 2/1986 | Shukla et al. | 310/330 |
| 4,620,438 | 11/1986 | Howng | 73/35 |
| 4,711,129 | 12/1987 | Stubenberg et al. | 73/708 |
| 4,767,960 | 8/1988 | Strobel | 310/338 |
| 4,829,825 | 5/1989 | Lawford | 73/706 |
| 4,993,266 | 2/1991 | Omura et al. | 73/720 |
| 5,003,824 | 4/1991 | Fukada et al. | 73/651 |
| 5,035,137 | 7/1991 | Burkard et al. | 73/723 |
| 5,126,617 | 6/1992 | Lukasiewicz et al. | 310/338 |
| 5,168,192 | 12/1992 | Kosugi et al. | 73/715 |

FOREIGN PATENT DOCUMENTS

| | | |
|---|---|---|
| 0090872 | 10/1983 | European Pat. Off. . |
| 0200709 | 11/1986 | European Pat. Off. . |
| 0511762 | 11/1992 | European Pat. Off. . |
| 59-70936 | 4/1984 | Japan . |
| 59-116025 | 7/1984 | Japan . |
| 60-157032 | 8/1985 | Japan . |
| 62-140038 | 6/1987 | Japan . |
| 62-204137 | 9/1987 | Japan . |
| 63-122926 | 5/1988 | Japan . |
| 63-148137 | 6/1988 | Japan . |
| 236328 | 2/1990 | Japan . |
| 236327 | 2/1990 | Japan . |
| 3282224 | 12/1991 | Japan ............. 73/723 |
| 4290937 | 10/1992 | Japan . |
| 445152 | 2/1968 | Switzerland . |
| 2211659 | 7/1989 | United Kingdom ........ 73/115 |

OTHER PUBLICATIONS

Ueda, et al.: "Combustion Pressure Sensor for Toyota Lean Burn Engine Control", pp. 2–5, (w/ partial English translation).

Otsuka: "Pressure Detector" Journal of Nippondenso Technical Disclosure: Mar. 15, 1984, p. 123 (w/English translation).

Nagase: "Pressure Sensor" Journal of Nippondenso Technical Disclosure: Sep. 15, 1993, p. 220 (w/English translation).

Primary Examiner—Richard Chilcot
Assistant Examiner—George M. Dombroske
Attorney, Agent, or Firm—Cushman Darby & Cushman

[57] ABSTRACT

A diaphragm portion 20 causes deflection, when high-temperature fluid pressure acts on the pressure sensing surface A of the diaphragm portion 20. This deflection is transmitted via pressure transmitting members 7, 8 to a deflection sensing member 6 which generates an electric signal in response to a pressure received.

The diaphragm portion 20 has a recess portion 21 at its center. The recess portion 21 is symmetrical about a central axis of the diaphragm portion 20. A tip end of the pressure transmitting member 7 is brought into contact with the recess portion 21 at a central point. A tapered portion 2d of the diaphragm 20 has a thickness of $t_3$ which is not larger than the thickness $t_1$ of an outer peripheral portion 2b or $t_2$ of a central bottom portion 2c. Furthermore, a heat insulating plate can be provided on the diaphragm to protect the surface A of the diaphragm portion from heat radiation of high-temperature fluid.

14 Claims, 8 Drawing Sheets

FIG. 10(A) PRIOR ART
FIG. 10(B) PRIOR ART
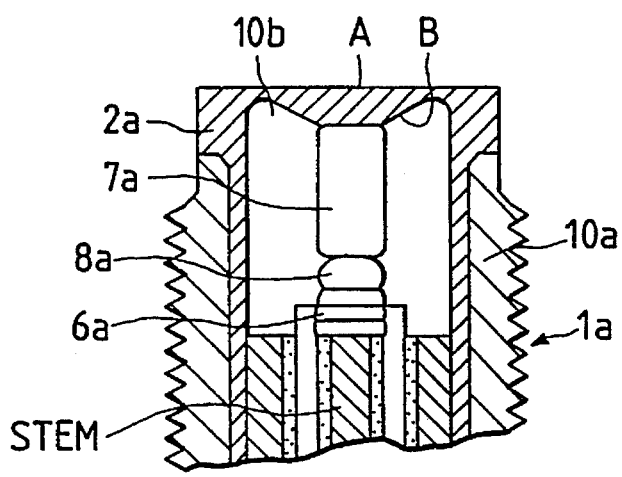
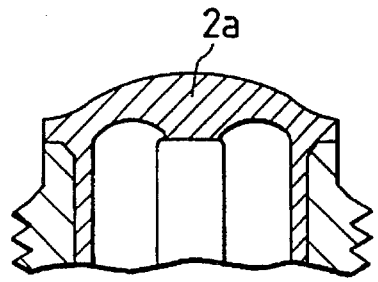
FIG. 11
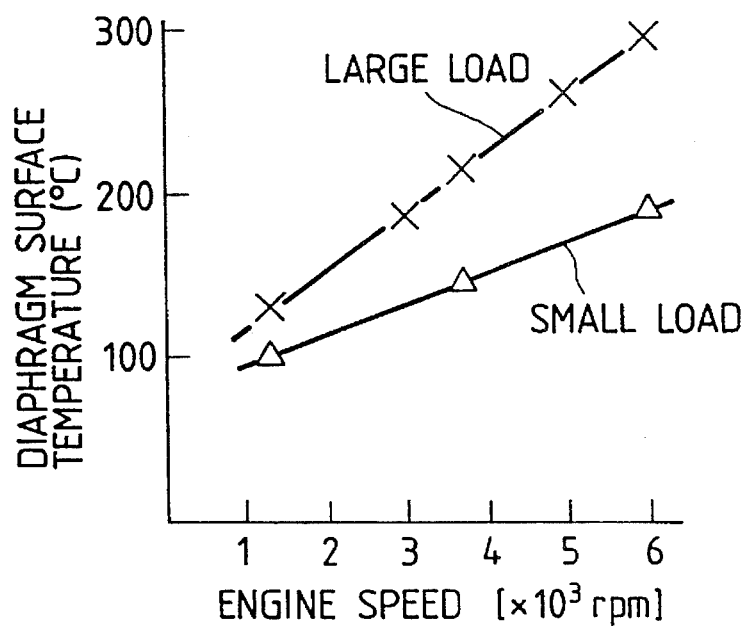

5,488,868

HIGH-TEMPERATURE PRESSURE SENSOR

BACKGROUND OF THE INVENTION

1. Field of the Invention

The present invention relates to a high-temperature pressure sensor, which is preferably used for detecting combustion gas pressure in a cylinder of an internal combustion engine.

2. Description of Related Art

FIG. 10(A) shows one example of a conventional high-temperature pressure sensor.

This pressure sensor comprises a housing 1a with a bore 10b surrounded by a cylindrical wall 10a, a deflection sensing element 6a provided in the bore 10b, a diaphragm 2a having a peripheral end fixed to the cylindrical wall 10a to close the opening of the bore 10b and deflectable in an axial direction of the cylindrical wall 10a when high-temperature fluid pressure acts on its surface (i.e. pressure sensing surface) A, and pressure transmitting members 7a, 8a transmitting the deflection of the pressure sensing surface A to the deflection sensing element 6a. For example, Unexamined Japanese Patent application No. HEI 4-290937/1992 discloses such a high-temperature pressure sensor.

The diaphragm 2a has the front surface A subjected to, for example, combustion gas and a reverse surface B facing the bore 10b in the housing 1a. Due to temperature difference occurring between the surfaces A and B when the diaphragm 2a receives heat energy from the combustion gas, the surface A causes a thermal expansion larger than that of the surface B. Thus, the diaphragm 2a protrudes outward (i.e. toward a combustion chamber), as shown in FIG. 10(B).

This deflection is transmitted to the deflection sensing element 6a via the transmitting members 7a, 8a, resulting in output errors. Accordingly, measuring accuracy is deteriorated.

Cancellation of the deflection of pressure sensing surface due to temperature difference between the surfaces A and B is very difficult, because the temperature difference widely changes depending on engine operating conditions.

FIG. 11 shows relationship between engine speeds and maximum surface temperatures of the diaphragm 2a according to the high-temperature pressure sensor of FIG. 10, two lines of which correspond to large and small engine load conditions, respectively. FIG. 12 shows relationship between crank angles and surface temperatures of the diaphragm 2a at a predetermined engine speed in both large and small engine load conditions. It is understood from FIGS. 11 and 12 that the temperature of the surface A of diaphragm 2a widely varies depending on engine speeds, engine loads and crank angles.

FIG. 13 shows a change of actual sensor output (solid line) and a change of actual cylinder pressure (dot line) during one complete combustion cycle. As illustrated in FIG. 13, the sensor output is smaller than the actual cylinder pressure due to adverse effect of thermal deflection of the diaphragm 2a derived from temperature difference between the surfaces A and B. Namely, combustion gas pressure generally acts as compression force on the deflection sensing element 6a while thermal deflection of the diaphragm 2a decreases this compression force unexpectedly.

Temperature of the surface A widely varies in accordance with temperature change of combustion chamber which is related to engine speeds, engine loads and crank angles. Temperature difference between the surfaces A and B also varies widely depending on engine speeds, engine loads and crank angles.

Temperature of the surface A also changes in accordance with the amount of soot accumulated on the surface A.

SUMMARY OF THE INVENTION

Accordingly, in view of above-described problems encountered in the prior art, an object of the present invention is to provide a high-temperature pressure sensor which is accurate and capable of realizing reduction of measuring error derived from thermal deflection of a diaphragm of the sensor.

In order to accomplish above and other objects, a first aspect of the present invention provides a high-temperature pressure sensor comprising: a housing having a bore defined by a cylindrical wall; a deflection sensing element provided in the bore; a diaphragm portion closing an opening of the bore, the diaphragm portion having a peripheral edge portion fixed to the cylindrical wall and a pressure acting surface deflectable in an axial direction of the cylindrical wall; a pressure transmitting member interposed between the diaphragm portion and the deflection sensing element for transmitting deflection of the pressure acting surface to the deflection sensing element; and the diaphragm portion of the diaphragm portion being divided into a central bottom portion and an outer peripheral portion, the central bottom portion being recessed with respect to the outer peripheral portion.

In the high-temperature pressure sensor in accordance with the above first aspect of the present invention, it is preferable that the central bottom portion and outer peripheral portion have flat surfaces parallel with each other.

Furthermore, it is preferable that the central region and the outer region is connected by a tapered region. The thickness of the tapered region is no greater than that of the central region or the outer region.

Still further, it is preferable that the central bottom portion is symmetrical about a central axis of the diaphragm portion.

Yet further, it is preferable that the pressure transmitting member is brought into contact with the central bottom portion at a point.

Moreover, it will be desirable to provide a heat insulating member for shielding the pressure acting surface of the diaphragm portion.

A second aspect of the present invention provides a high-temperature pressure sensor comprising: a housing having a bore defined by a cylindrical wall; a deflection sensing element provided in the bore; a diaphragm portion closing an opening of the bore, the diaphragm portion having a peripheral edge portion fixed to the cylindrical wall and a pressure acting surface deflectable in an axial direction of the cylindrical wall; a pressure transmitting member interposed between the diaphragm portion and the deflection sensing element for transmitting deflection of the pressure acting surface to the deflection sensing element; and a heat insulating member for shielding the pressure acting surface of the diaphragm portion.

In the high-temperature pressure sensor in accordance with the above second aspect of the present invention, preferable that the heat insulating member is preferably a disk-shaped plate mounted on a shaft portion protruding from the center of the pressure acting surface, or a cup having a cylindrical wall with a plurality of openings and coupled with the peripheral end of the diaphragm portion, or a heat insulating layer coated on the pressure acting surface.

BRIEF DESCRIPTION OF THE DRAWINGS

The above and other objects, features and advantages of the present invention will become more apparent from the following detailed description which is to be read in conjunction with the accompanying drawings, in which:

FIG. 10(A) is a cross-sectional view showing a conventional high-temperature pressure sensor;

FIG. 10(B) is a cross-sectional view partly showing the conventional high-temperature pressure sensor of FIG. 10(A);

FIG. 11 is a graph showing relationship between engine speeds and diaphragm surface temperatures in accordance with the sensor of FIG. 10(A);

DETAILED DESCRIPTION OF THE PREFERRED EMBODIMENTS

Hereinafter, preferred embodiments of the present invention will be explained in detail with reference to the accompanying drawings.

Figure 1:
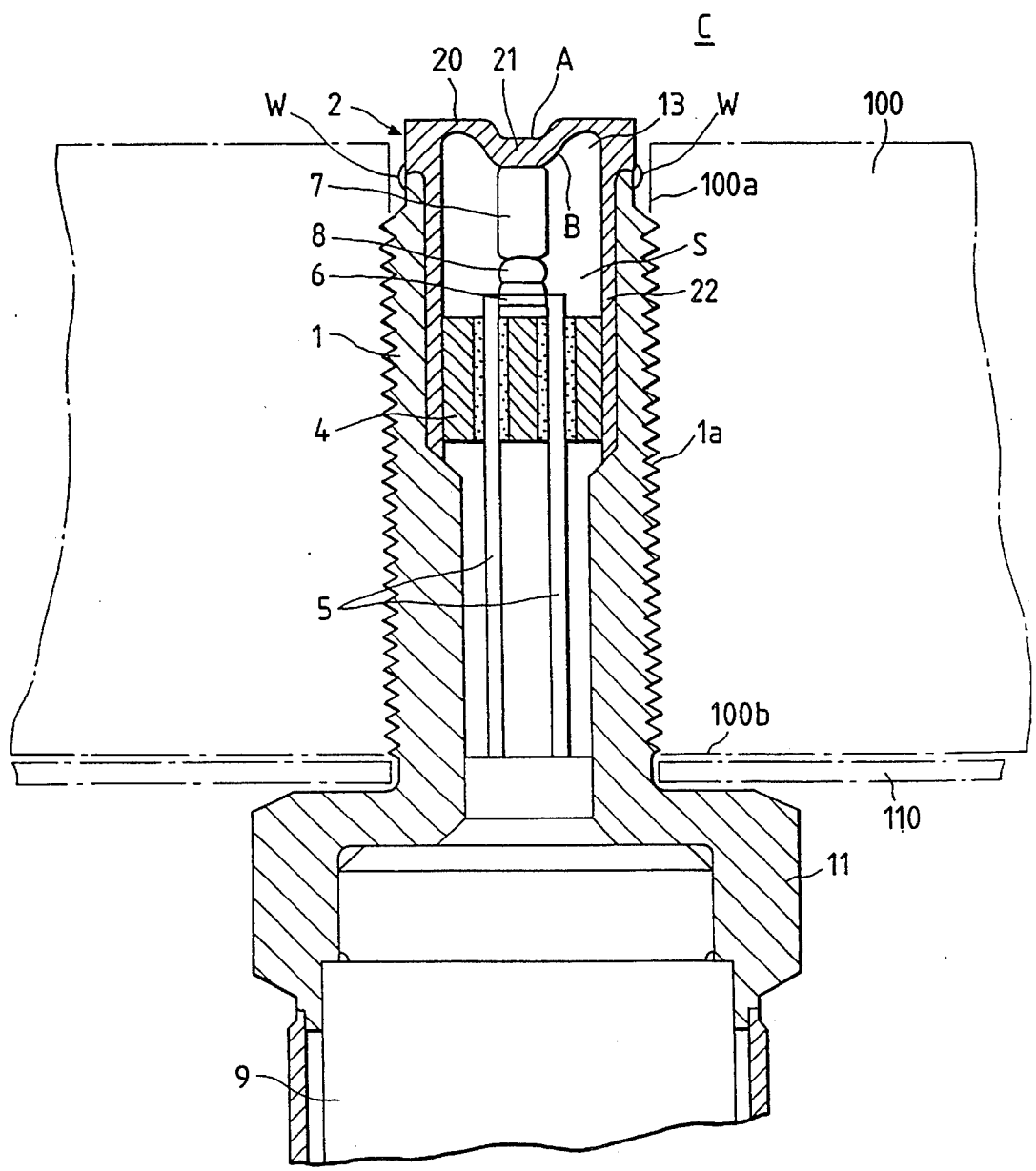
FIG. 1 is a cross-sectional view showing a high-temperature pressure sensor in accordance with a first embodiment of the present invention.

FIG. 1 is a cross-sectional view showing a high-temperature pressure sensor installed on the engine block of an internal combustion engine.

This high-temperature pressure sensor comprises a housing 1, made of a stainless cylinder with open ends, having an outer threaded surface which is screwed into a threaded hole 100a provided on a cylinder head 100 of an engine block. The housing 1 has a base end 11 with a larger-diameter portion. This base end 11 is pressed against the outer surface 100b of the cylinder head 100 through a gasket 110 when the housing 1 is tightly screwed into the threaded hole 100a, thereby providing gas sealing between the housing 1 and the cylinder head 100.

The housing 1 has an open end facing to a combustion chamber C. A stainless steel cup 2, with a bottom 20 and a cylindrical wall 22 of thin thickness, is inserted through this open end and welded (W) to the housing 1 at the peripheral end of the bottom 20. Thus, the inside space of the housing 1, i.e. a bore 13, is sealed from the combustion chamber C. The bottom 20 has a recess portion 21 and is formed into disk-like shape. The surface of the bottom 20 faces the combustion chamber C and is deflectable in an axial direction of the cylindrical wall 22 when received high-temperature fluid pressure from the combustion chamber C. Thus, the bottom 20 functions as a diaphragm portion serving as a pressure acting surface of the present invention.

The recess portion 21 is positioned at a center of the diaphragm portion 20. More specifically, the recess portion 21 is roughly divided into a central bottom portion and an outer peripheral portion. The central bottom portion corresponds to the recess portion 21 recessed axially remote from the combustion chamber C.

A stem 4, a metallic circular rod, is inserted through an opening of the cup 2 and welded to the inside surface of the cylindrical wall 22. The stem 4 has a plurality of through holes extending in the axial direction of the cylindrical wall 22. A metallic electrode pin (hard pin) 5 is inserted into each through hole with hermetic seal. Thus, the stem 4 and the cup 2 cooperatively define a hermetic space S, i.e. the bore 13.

The stem 4 has an end surface facing to the hermetic space S. A semiconductor deflection sensing element 6, such as a piezoelectric ceramic element, is bonded on the end surface of the stem 4. The semiconductor deflection sensing element 6 functions as a deflection sensing element of the present invention.

A ceramic circular rod 7 and a metallic mushroom member 8 are connected in series and interposed between the diaphragm portion 20 and the semiconductor deflection sensing element 6. The mushroom member 8 has a flat end surface at the bottom thereof which is bonded to the surface of rod wafer (which will be later described) of the semiconductor deflection sensing element 6. The mushroom member 8 has a semi-spherical surface at the top thereof which is bonded to one end surface (i.e. a lower end surface in FIG. 1) of the circular rod 7. The other end surface of the circular rod 7 is bonded to the back surface, i.e. a convex surface, of the recess portion 21.

As the semi-spherical surface of the mushroom member 8 is brought into contact with the circular rod 7 at its uppermost point which is radial center of the mushroom member 8, a force acting from the diaphragm portion 20 through the circular rod 7 can be received at an axis of the mushroom member 8. Circular rod 7 and mushroom member 8 function as a pressure transmitting member of the present invention, which is interposed between the diaphragm portion 20 and the semiconductor deflection sensing element 6 for transmitting deflection of the pressure acting surface A of diaphragm portion 20 to the semiconductor deflection sensing element 6. Diaphragm portion 20, circular rod 7, mushroom member 8 and semiconductor deflection sensing element 6 are held together with a preload compression force given by deflection of the diaphragm portion 20, thereby increasing connection force therebetween. As the circular rod 7 is made of ceramic, such as alumina, heat transfer amount to the semiconductor deflection sensing element 6 can be fairly reduced. The larger-diameter base end 11 of the housing 1 has an inside space accommodating a casing 9 containing an amplification circuit device (not shown) amplifies an output of the semiconductor deflection sensing element 6.

One end of each metallic electrode pin 5 is wire bonded to a corresponding output electrode of the semiconductor deflection sensing element 6. The other end of the metallic electrode pin 5 is guided into the casing 9 and soldered on a corresponding electrode of the amplification circuit device.

Next, the semiconductor deflection sensing element 6 will be explained in more detail.

Figure 2A:
FIGS. 2(A) to 2(H) are views illustrating manufacturing steps of a semiconductor deflection sensing element.

FIGS. 2(A) to 2(H) illustrate manufacturing steps of such a semiconductor deflection sensing element 6. As illustrated in FIG. 2(A), n⁻ conductive silicon wafer (i.e. gauge wafer) 60, having a crystal axis of <110>, has a surface with a region 61 qualifying as piezo resistance which is defined by a mask pattern 62.

Figure 2B:
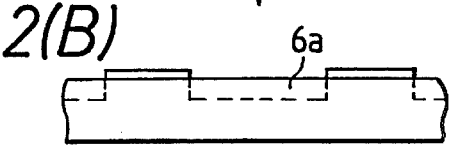
Figure 2C:
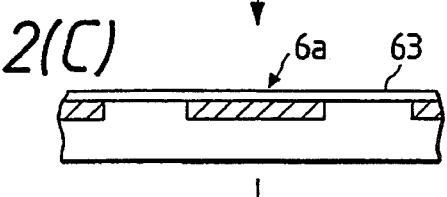

The region 61 is subjected to ion injection to cause diffusion and activation, thereby forming a deflection sensing portion 6a which is a Wheatstone bridge of piezo resistance, as illustrated in FIG. 2(B). A protecting film 63, made of silicon oxide, is then formed on the upper surface of the wafer 60 by the thermal oxidation method, as illustrated in FIG. 2(C).

Figure 2D:
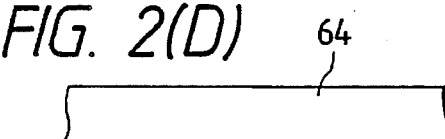
Figure 2E:
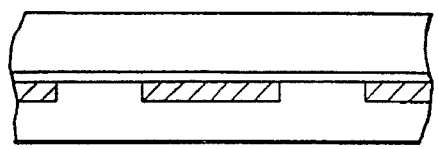

A wafer (i.e rod wafer) 64, having a crystal axis of <110>, is prepared as illustrated in FIG. 2(D). Thereafter, both wafers 60 and 64 are directly bonded to one another in a clean atmosphere, as illustrated in FIG. 2(E).

Figure 2F:
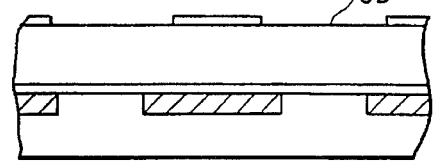
Figure 2G:
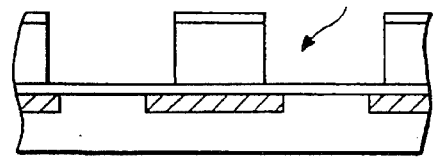
Figure 2H:
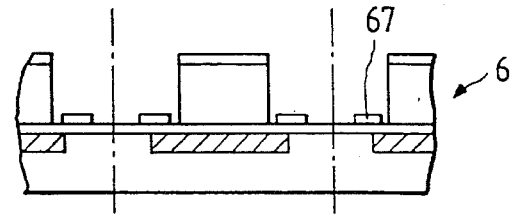

A disk-like mask pattern 65 is placed on the upper surface of rod wafer 64, as illustrated in FIG. 2(F). By anisotropically etching on the rod wafer 64, a plurality of rods 66 are formed as illustrated in FIG. 2(G). Aluminum electrodes 67 are formed in the vicinity of each rod 66 by a photolithography method. After dicing, a chip is finally obtained. Besides the above-described manufacturing method, other known methods will be able to manufacture such a semiconductor deflection sensing element 6.

An operation of this high-temperature pressure sensor will be explained below.

When a detonation occurs in the engine cylinder head 100, its pressure wave acts on the diaphragm portion 20. Deflection of the diaphragm portion 20 is transmitted through the circular rod 7 and the mushroom member 8 to the semiconductor deflection sensing element 6. This sensing element 6, in turn, generates a bridge output in response to the magnitude of the deflection transmitted. The bridge output signal is then supplied to the amplification circuit device, which amplifies the signal and finally outputs it to associated devices.

The function and effect of the diaphragm portion 20 of the present invention will be explained hereinafter.

As the circular diaphragm portion 20 has a recess 21 at a radially center thereof, thermal expansion of the diaphragm portion 20 toward the combustion chamber C can be effectively suppressed. This mechanism will be explained in more detail with reference to FIG. 3. The diaphragm portion 20 has a front surface (i.e. pressure acting surface) A facing the combustion chamber C and a reverse surface B facing the bore 13 (i.e. hermetic space S). The diaphragm portion 20 includes a central bottom portion 2c and an outer peripheral portion 2b whose surfaces are flat and parallel with each other. These flat portions 2b, 2c are connected by a tapered portion 2d. The recess portion 21 is thus constituted by the central bottom portion 2c serving as a bottom of the recess portion 21 and the tapered portion 2d serving as an inclined wall of the recess portion 21. The outer peripheral portion 2b, disposed at the front end of the diaphragm portion 20, has a thickness $t_1$, and the central bottom portion 2c has a thickness $t_2$. The tapered portion 2d has a thickness $t_3$ which is no greater than the thicknesses $t_1$ and $t_2$ of the outer peripheral portion 2b and the central bottom portion 2c. (i.e. $t_3 \leq t_1$, $t_3 \leq t_2$)

Figure 3:
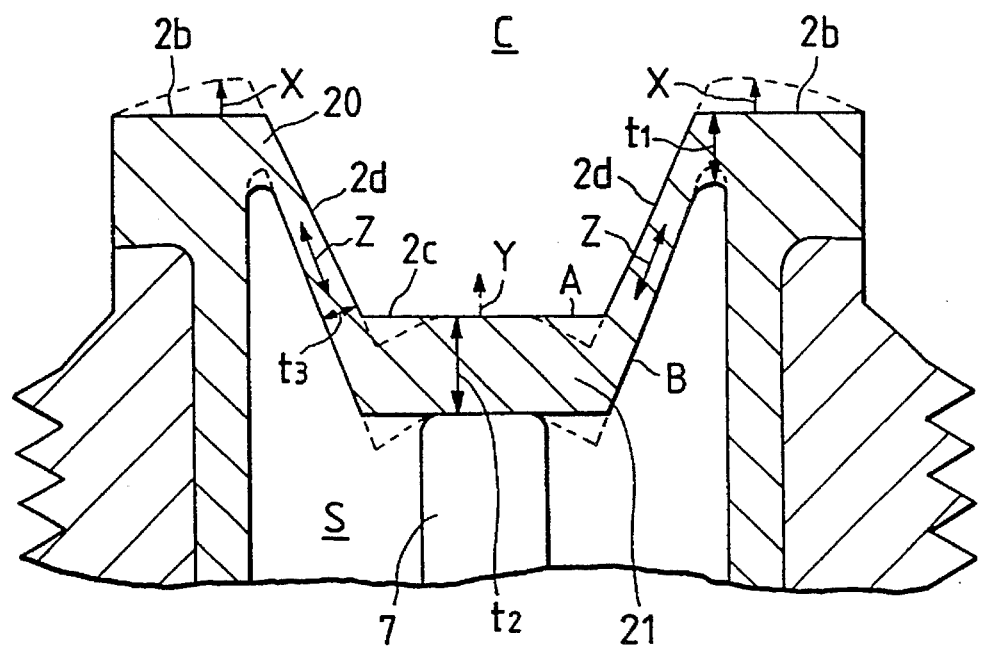
FIG. 3 is an enlarged cross-sectional view showing an essential part of the diaphragm portion in accordance with the first embodiment of the present invention.

The front surface A of the diaphragm portion 20 is subjected to relatively severe thermal condition, compared with the surface B. Thus, when the diaphragm portion 20 is heated, temperature difference between the surfaces A and B increases, resulting in thermal expansion of the surface A with respect to the surface B. Therefore, the outer peripheral portion 2b protrudes along the solid arrow X toward the combustion chamber C. The tapered portion 2d expands along the solid line Z. Meanwhile, the central bottom portion 2c tends to protrude along the dot arrow Y toward the combustion chamber C, causing deformation like a convex shape facing toward the combustion chamber C as shown by the dot line in FIG. 3. However, a forward expansion at the center of the central bottom portion 2c (i.e. at the radial center of recess portion 21) can be suppressed to be substantially zero, because the protrusion of the central bottom portion 2c is canceled by the backward shift of the central bottom portion 2c itself. In other words, the Z-directional thermal expansion of the tapered portion 2d absorbs the Y-directional thermal expansion of the central bottom portion 2c. This is because the tapered portion 2d causes a relatively larger thermal expansion compared with that of the flat portions 2b and 2c since the thickness $t_3$ of the tapered portion 2d is no greater than the thicknesses $t_1$ and $t_2$ of the flat portions 2b and 2c. The dot line of FIG. 3 shows a thermal expansion state of the diaphragm portion 20.

Figure 4:
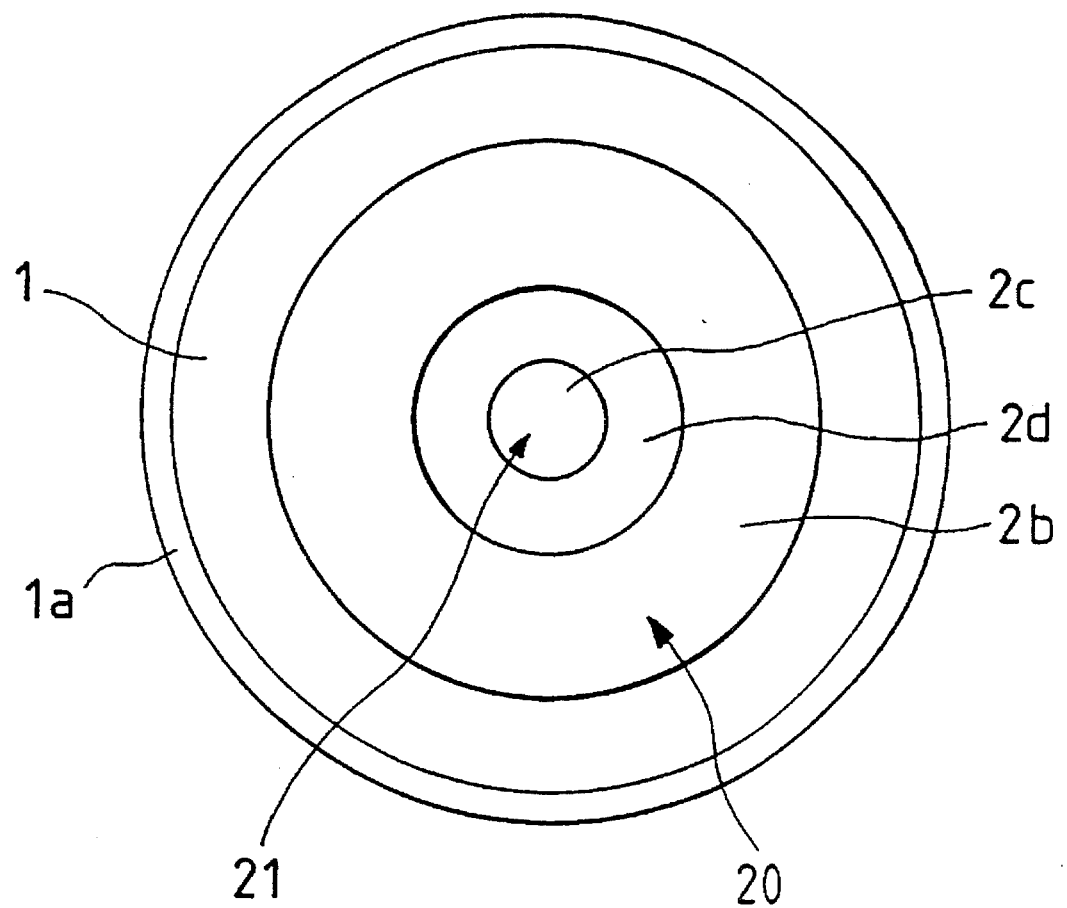
FIG. 4 is a plan view of FIG. 3.

According to the present invention, the front end of circular rod 7 is brought into contact with the radial center of the recess portion 21 which is most stable against the thermal expansion. Accordingly, the circular rod 7 is virtually free from adverse effect of temperature difference between the surfaces A and B. Therefore, the semiconductor deflection sensing element 6 can maintain measuring accuracy. The recess portion 21 has circular configuration, which is symmetrical about a central axis of the diaphragm portion 20 as shown in FIG. 4. However, the diaphragm portion 20 can be formed in any other shape, such as a rectangular or star configuration, as long as it is symmetrical about the central axis of the diaphragm portion 20.

Figure 5:
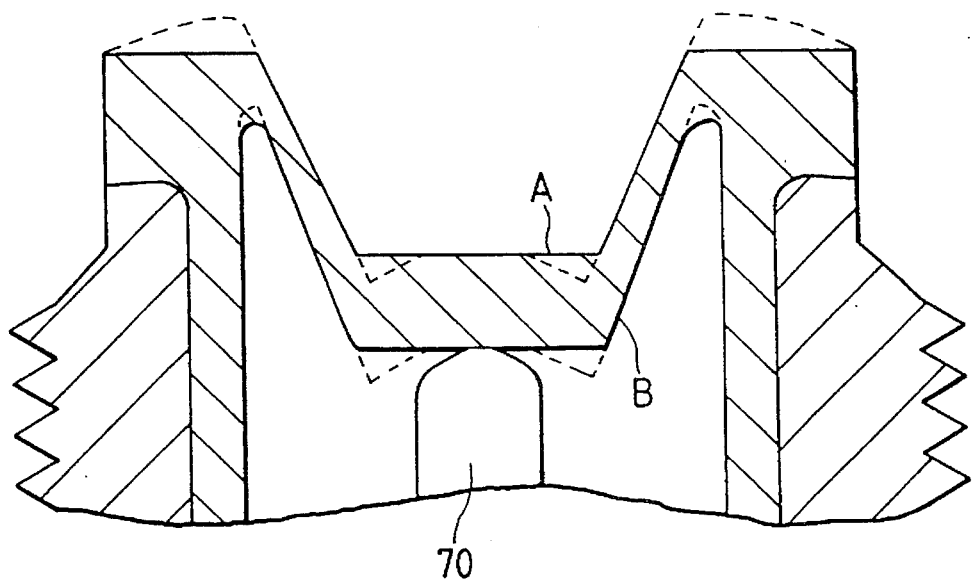
FIG. 5 is an enlarged cross-sectional view showing an essential part of the diaphragm portion in accordance with the first embodiment of the present invention.

FIG. 5 shows a modified pressure transmitting member 70 which has a semi-spherical head contacting with the reverse surface B of the recess portion 21 at a central point. Thus, the pressure transmitting member 70 can be surely brought into contact with the radial center of recess portion 21. Accordingly, adverse effect of temperature difference between the surfaces A and B can be more suppressed. And, measuring accuracy of the sensor can be further improved.

Figure 6:
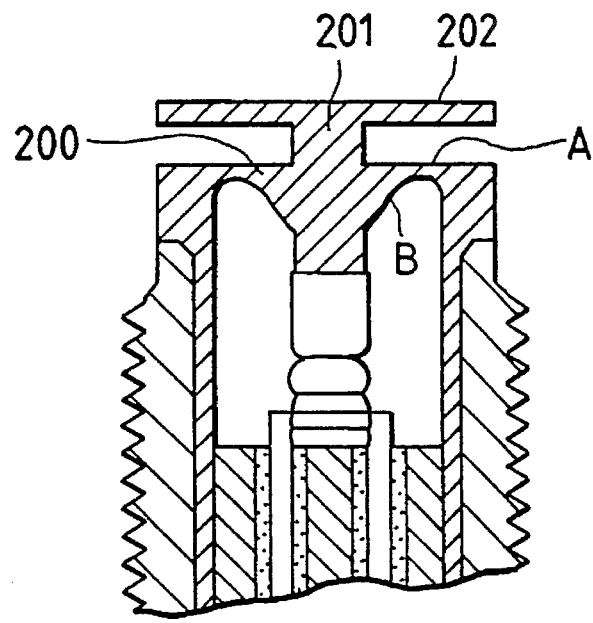
FIG. 6 is a cross-sectional view showing a high-temperature pressure sensor in accordance with a second embodiment of the present invention.

A high-temperature pressure sensor in accordance with the second embodiment of the present invention will be explained with reference to FIG. 6.

According to the second embodiment, a diaphragm portion 200 itself has no recess portion as well in the conventional diaphragm portion 2a shown in FIG. 10(A) but has a smaller-diameter shaft 201 integrally formed on the surface A of diaphragm portion 200 at its radial center. On the top of this shaft 201, there is integrally formed a disk-shaped heat insulating plate 202 extending parallel to the surface A of diaphragm portion 200. The area of the heat insulating plate 202 is identical with that of the diaphragm portion 200.

With this arrangement, the diaphragm portion 200 is protected from direct exposure to heat radiation emitted from combustion gas. As a result, when combustion gas temperature varies due to various engine operating conditions, temperature change of the surface A of the diaphragm portion 200 can be limited to a relatively small range. The deflection of the diaphragm portion 200 is therefore reduced so the output error of the semiconductor deflection sensing element 6 can be reduced.

Figure 7:
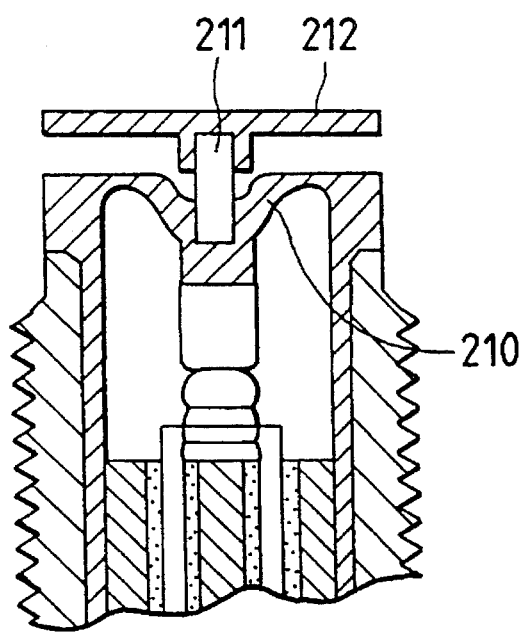
FIG. 7 is a cross-sectional view showing a high-temperature pressure sensor in accordance with a third embodiment of the present invention.

A high-temperature pressure sensor in accordance with the third embodiment of the present invention will be explained with reference to FIG. 7.

According to the third embodiment, a diaphragm portion 210 itself has a recess portion as well in the diaphragm portion 20 of the first embodiment. The diaphragm portion 210 has also a smaller-diameter shaft 211 protruding from the radial center of the surface A of diaphragm portion 210. On the top of this shaft 211, there is formed a disk-shaped heat insulating plate 212 extending parallel to the surface A of diaphragm portion 210. The area of the heat insulating plate 212 is identical with that of the diaphragm portion 210.

With such an arrangement, effects of the above-described first and second embodiments can be both realized.

Figure 8:
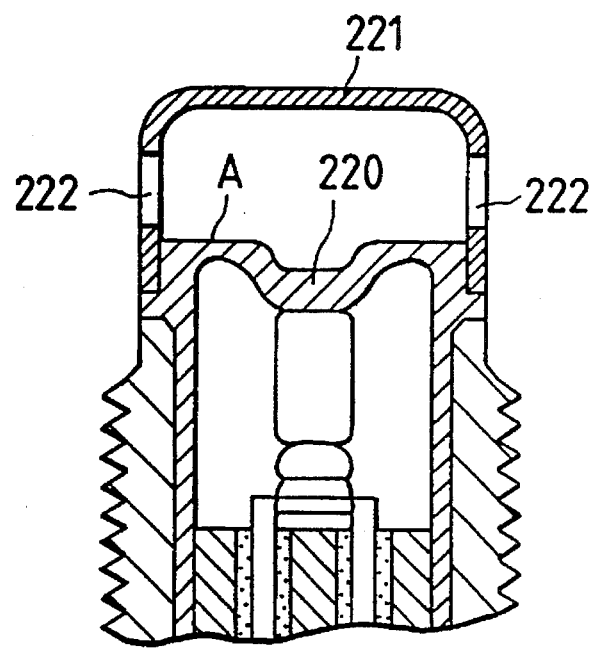
FIG. 8 is a cross-sectional view showing a high-temperature pressure sensor in accordance with a fourth embodiment of the present invention.

A high-temperature pressure sensor in accordance with the fourth embodiment of the present invention will be explained with reference to FIG. 8.

According to the fourth embodiment, a diaphragm portion 220 itself has a recess portion as well in the diaphragm portion 20 of the first embodiment. The diaphragm portion 220 is covered by a stainless heat insulator cup 221. The peripheral end of the diaphragm portion 220 is coupled with the cylindrical open end of the heat insulator cup 221. A plurality of combustion gas inlet/outlet openings 222 are provided on the cylindrical thin wall of the heat insulating cup 221, so that the surface A of the diaphragm 220 can be exposed to combustion gas in the combustion chamber. With this arrangement, the diaphragm portion 220 does not directly receive radiation energy from combustion gas. As a result, when combustion gas temperature varies due to various engine operating conditions, temperature change of the surface A of the diaphragm portion 220 can be suppressed within a relatively small range. The deflection amount of the diaphragm portion 220 is therefore reduced and the output error of the semiconductor deflection sensing element 6 can be reduced.

Figure 9:
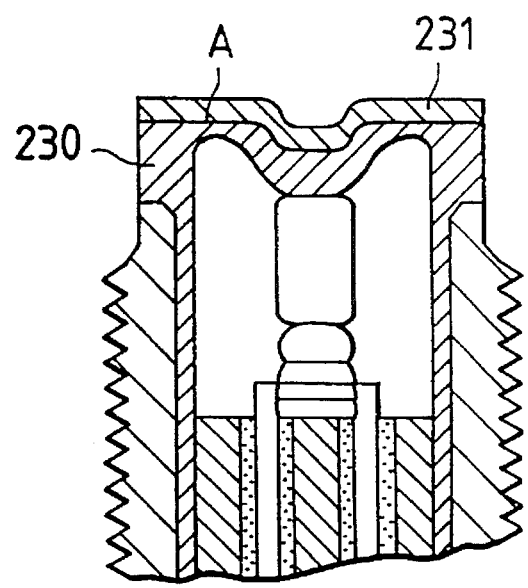
FIG. 9 is a cross-sectional view showing a high-temperature pressure sensor in accordance with a fifth embodiment of the present invention.
Figure 12:
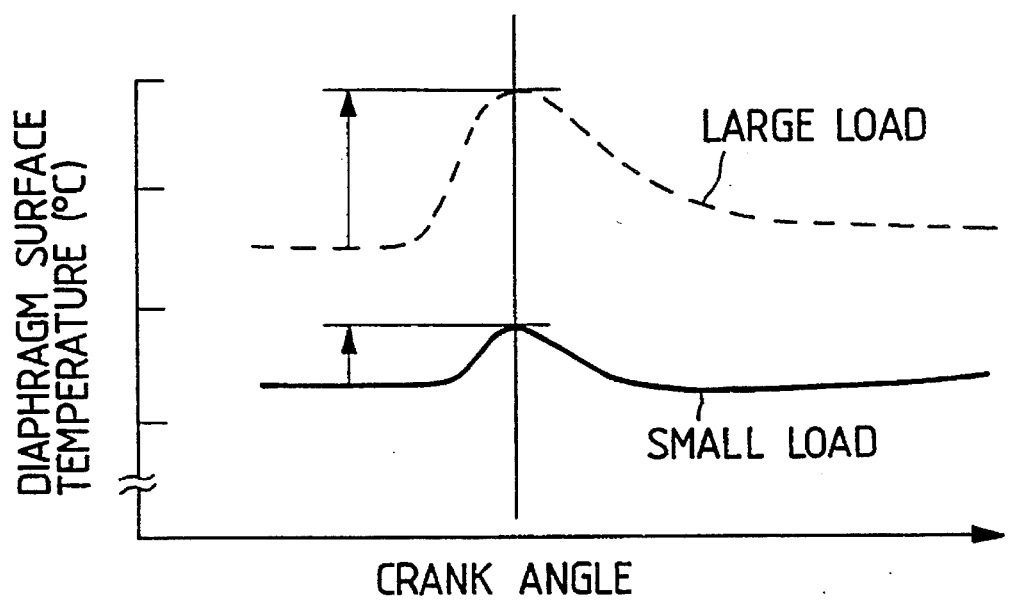
FIG. 12 is a graph showing relationship between crank angles and diaphragm surface temperatures in accordance with the sensor of FIG. 10(A)
Figure 13:
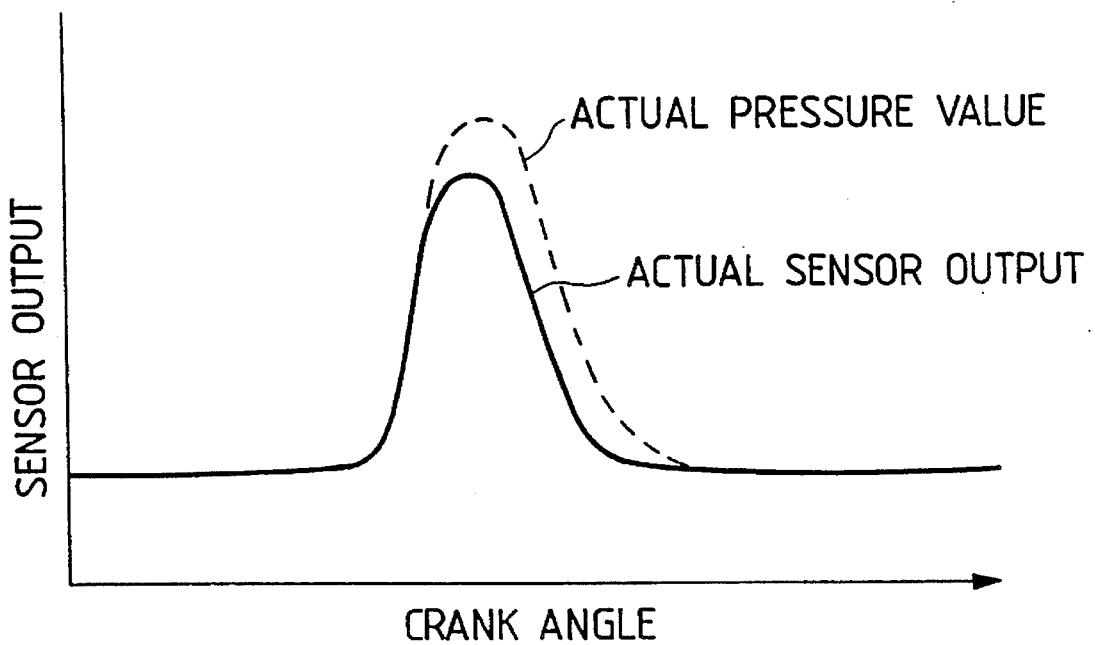
FIG. 13 is a graph showing relationship between crank angles and sensor outputs in accordance with the sensor of FIG. 10(A).

A high-temperature pressure sensor in accordance with the fifth embodiment of the present invention will be explained with reference to FIG. 9.

According to the fifth embodiment, a diaphragm portion 230 itself has a recess portion as well in the diaphragm portion 20 of the first embodiment. The surface A of diaphragm portion 230 is coated by heat insulating layer 231 of ceramic (alumina). With this arrangement, the diaphragm portion 230 does not directly receive radiation energy from combustion gas in the same manner as in the second to fourth embodiments.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A pressure sensor comprising:

a housing having a bore defined by a cylindrical wall;

a diaphragm portion closing an opening of said bore, said diaphragm portion having a peripheral edge portion fixed to said cylindrical wall and a pressure acting surface deflectable in an axial direction of said cylindrical wall, wherein said diaphragm portion is configured to be self-compensating for thermal expansion;

a deflection sensing element provided in said bore; and a pressure transmitting member interposed between said diaphragm portion and said deflection sensing element for transmitting deflection of said pressure acting surface to said deflection sensing element;

wherein said diaphragm portion is a single element and includes a central bottom portion and an outer peripheral portion connected to said central bottom portion by an annular tapered portion therebetween, wherein said central bottom portion is recessed into said bore relative to said outer peripheral portion located therearound, wherein a thickness of said tapered portion is no greater than a thickness of said central bottom portion and said outer peripheral portion.

2. The high-temperature pressure sensor in accordance with claim 1, wherein said central bottom portion and outer peripheral portion have surfaces parallel with each other.

3. The high-temperature pressure sensor in accordance with claim 1, wherein said central bottom portion is symmetrical about a central axis of said diaphragm portion.

4. The high-temperature pressure sensor in accordance with claim 1, wherein said pressure transmitting member is brought into contact with said central bottom portion at a point.

5. The high-temperature pressure sensor in accordance with claim 1, further comprises a heat insulating member for shielding said pressure acting surface of said diaphragm portion.

6. A high-temperature pressure sensor in accordance with claim 5, wherein said heat insulating member is a disk-shaped plate connected to and extending parallel to said pressure acting surface.

7. A high-temperature pressure sensor in accordance with claim 5, wherein said heat insulating member is a cup having a cylindrical wall with a plurality of openings and coupled with said peripheral end of the diaphragm portion.

8. A high-temperature pressure sensor in accordance with claim 5, wherein said heat insulating member is a heat insulating layer coated on said pressure acting surface.

9. A high-temperature pressure sensor comprising:

a housing having a bore surrounded by a cylindrical wall;

a diaphragm portion closing an opening of said bore, said diaphragm portion having a peripheral edge portion fixed to said cylindrical wall and a pressure acting surface deflectable in an axial direction of said cylindrical wall, wherein said diaphragm portion is configured to be self-compensating for thermal expansion;

a deflection sensing element provided in said bore;

a pressure transmitting member interposed between said diaphragm portion and said deflection sensing element for transmitting deflection of said pressure acting surface to said deflection sensing element; and a heat insulating member, independent of said diaphragm portion, for shielding said pressure acting surface of said diaphragm portion, wherein said diaphragm portion is a single element and includes a central bottom portion and an outer peripheral portion connected to said central bottom portion by an annular tapered portion therebetween, wherein said central bottom portion is recessed into said bore relative to said outer peripheral portion located therearound, wherein a thickness of said tapered portion is no greater than a thickness of said central bottom portion and said outer peripheral portion.

10. A high-temperature pressure sensor in accordance with claim 9, wherein said heat insulating member is a disk-shaped plate connected to and extending parallel to said pressure acting surface.

11. A high-temperature pressure sensor in accordance with claim 9, wherein said heat insulating member is a cup having a cylindrical wall with a plurality of openings and coupled with said peripheral end of the diaphragm portion.

12. A high-temperature pressure sensor in accordance with claim 9, wherein said heat insulating member is a heat insulating layer coated on said pressure acting surface.

13. A high-temperature pressure sensor comprising:

a housing having a bore defined by a cylindrical wall;

a diaphragm portion closing an opening of said bore, said diaphragm portion having a peripheral edge portion fixed to said cylindrical wall and a pressure acting surface deflectable in an axial direction of said cylindrical wall, said diaphragm portion including a central bottom portion and an outer peripheral portion disposed around said central bottom portion, said central bottom portion being recessed relative to said outer peripheral portion;

a deflection sensing element provided in said bore;

a pressure transmitting member interposed between said diaphragm portion and said deflection sensing element for transmitting deflection of said pressure acting surface to said deflection sensing element;

a heat insulating member for shielding said pressure acting surface of said diaphragm portion, said heat insulating member being a disk-shaped plate extending parallel to said pressure acting surface and spaced from said pressure acting surface via a shaft portion provided at a center of said pressure acting surface.

14. A high-temperature pressure sensor comprising:

a housing having a bore defined by a cylindrical wall;

a diaphragm portion closing an opening of said bore, said diaphragm portion having a peripheral edge portion fixed to said cylindrical wall and a pressure acting surface deflectable in an axial direction of said cylindrical wall;

a deflection sensing element provided in said bore;

a pressure transmitting member interposed between said diaphragm portion and said deflection sensing element for transmitting deflection of said pressure acting surface to said deflection sensing element; and a heat insulating member for shielding said pressure acting surface of said diaphragm portion, said heat insulating member being a disk-shaped plate extending parallel to said pressure acting surface and spaced from said pressure acting surface via a shaft portion provided at a center of said pressure acting surface of said diaphragm portion.

\* \* \* \* \*